US011446899B2

(12) United States Patent
Kusumoto et al.

(10) Patent No.: US 11,446,899 B2
(45) Date of Patent: Sep. 20, 2022

(54) TRANSPARENT FILM AND TRANSPARENT ELECTRODE

(71) Applicant: MITSUBISHI GAS CHEMICAL COMPANY, INC., Tokyo (JP)

(72) Inventors: Nobuhiko Kusumoto, Kanagawa (JP); Keisuke Konomi, Fukushima (JP); Madoka Yamaguchi, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 17/057,435

(22) PCT Filed: May 31, 2019

(86) PCT No.: PCT/JP2019/021799
§ 371 (c)(1),
(2) Date: Nov. 20, 2020

(87) PCT Pub. No.: WO2019/230966
PCT Pub. Date: Dec. 5, 2019

(65) Prior Publication Data
US 2021/0206966 A1    Jul. 8, 2021

(30) Foreign Application Priority Data

Jun. 1, 2018  (JP) .............................. JP2018-105967
Oct. 30, 2018 (JP) .............................. JP2018-203798

(51) Int. Cl.
| C08L 69/00 | (2006.01) |
| B32B 27/36 | (2006.01) |
| H01B 5/14  | (2006.01) |
| B32B 7/023 | (2019.01) |
| G06F 3/041 | (2006.01) |

(52) U.S. Cl.
CPC ............ B32B 7/023 (2019.01); B32B 27/365 (2013.01); C08L 69/00 (2013.01); H01B 5/14 (2013.01); *B32B 2307/202* (2013.01); *B32B 2307/412* (2013.01); *B32B 2307/536* (2013.01); *B32B 2307/546* (2013.01); *B32B 2307/558* (2013.01); *B32B 2457/00* (2013.01); *G06F 3/041* (2013.01)

(58) Field of Classification Search
CPC . B32B 7/023; B32B 27/365; B32B 2307/202; B32B 2307/412; B32B 2307/536; B32B 2307/546; B32B 2307/558; B32B 2457/00; C08L 69/00; H01B 5/14; G06F 3/041
See application file for complete search history.

(56) References Cited

U.S. PATENT DOCUMENTS 6,217,995 B1    4/2001    Handa

FOREIGN PATENT DOCUMENTS

| JP | 3-102657 A    | 4/1991 |
| JP | 10-109950 A   | 4/1998 |
| JP | 2000-111885 A | 4/2000 |
| JP | 2000-147202 A | 5/2000 |
| JP | 3131031 B2    | 1/2001 |
| JP | 2004-269844 A | 9/2004 |
| JP | 2017-210569 A | 11/2017 |

OTHER PUBLICATIONS

Sugano, "JP03-102657A—English Translation," Apr. 30, 1991, JPO, pp. 1-14 (Year: 1991).*
International Search Report issued in International Patent Application No. PCT/JP2019/021799, dated Aug. 27, 2019 and English Translation thereof.

* cited by examiner

*Primary Examiner* — Maria V Ewald
*Assistant Examiner* — Ethan Weydemeyer
(74) *Attorney, Agent, or Firm* — Greenblum & Bernstein, P.L.C.

(57) ABSTRACT

Provided is a transparent film having advantages such as excellent heat resistance, a birefringence that is not easily affected by the film forming conditions, and being uniform. According to one embodiment, there is provided a transparent film including a resin composition that includes a polycarbonate resin (A) having a structural unit represented by formula (1) and having a photoelastic coefficient of $80 \times 10^{-12}$ m$^2$/N or less.

[Formula 1]

(1)

24 Claims, No Drawings

TRANSPARENT FILM AND TRANSPARENT ELECTRODE

TECHNICAL FIELD

The present invention relates to a transparent film including a polycarbonate resin, and particularly a transparent film useful as a film constituting an optical film and a base material film.

BACKGROUND ART

Polycarbonate resins are used in various fields as a general-purpose engineering plastic having excellent transparency, impact resistance, heat resistance, dimensional stability, and the like. One characteristic application of polycarbonate resins is in the optical field, which utilizes their excellent transparency. A common polycarbonate resin is derived from bisphenol A and has a relatively high refractive index, and therefore its use as an optical lens is being studied. For example, Patent Literature 1 states that a polycarbonate resin obtained by copolymerizing specific structural units has excellent optical properties and impact resistance, and can be used for a spectacle lens or a camera lens. Further, Patent Literature 2 discloses an optical component made of an aromatic polycarbonate, and mentions an optical disc substrate, a pickup lens, and the like as specific examples of the optical component.

In addition, the use of polycarbonate resins in various films is also being investigated, and examples of such applications include films for electronic and electrical device parts, optical films, heat-resistant films, electrically insulating films, and the like (Patent Literature 3). Patent Literature 3 describes a polycarbonate film obtained by molding a polycarbonate copolymer having specific structural units, and states that the polycarbonate film has particularly excellent mechanical strength, heat resistance, and the like. Still further, research and development is being actively carried out to develop polycarbonate resins in a wide range of technical fields by utilizing the excellent properties of polycarbonate resin, but currently many of those are still in the process of development, and there is much room for improvement in terms of their properties. In the future, it is expected that the use of polycarbonate resins in a wider range of film applications will be investigated, and therefore, it is desired to develop a polycarbonate resin film having properties suitable for each application.

PRIOR ART DOCUMENTS

Patent Documents

Patent Document 1: Japanese Patent Laid-Open No. 2017-210569
Patent Document 2: Japanese Patent Laid-Open No. 10-109950
Patent Document 3: Japanese Patent No. 3131031

SUMMARY OF THE INVENTION

Problems to be Solved by the Invention

It is an object of the present invention is to provide a transparent film in which birefringence is not easily affected by film formation conditions.

Means for Solving the Problems

The present invention is as follows.
[1] A transparent film comprising a resin composition including a polycarbonate resin (A) having a structural unit represented by formula (1) and having a photoelastic coefficient of $80 \times 10^{-12}$ $m^2/N$ or less:

[Formula 1]

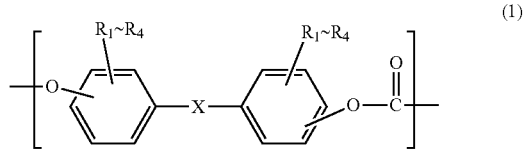

(1)

wherein $R_1$ to $R_4$ are each independently a hydrogen atom, an alkyl group, or an aryl group; and X is a single bond or a group represented by the following formula (2):

[Formula 2]

(2)

wherein $R_5$ and $R_6$ are a hydrogen atom, an alkyl group, or an aryl group; and at least one of $R_5$ and $R_6$ is an aryl group.

[1-1] A transparent film comprising a polycarbonate resin (A) including a structural unit represented by formula (1) and having a photoelastic coefficient of $80 \times 10^{12}$ $m^2/N$ or less:

[Formula 3]

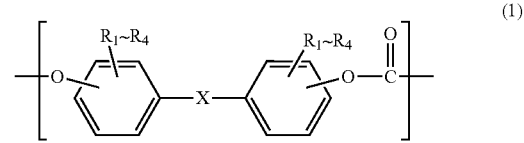

(1)

wherein $R_1$ to $R_4$ are each independently a hydrogen atom, an alkyl group, or an aryl group; and X is a single bond or a group represented by the following formula (2):

[Formula 4]

(2)

wherein $R_5$ and $R_6$ are a hydrogen atom, an alkyl group, or an aryl group; and at least one of $R_5$ and $R_6$ is an aryl group,
provided that a case where the polycarbonate resin (A) is a copolymer including a structural unit represented by formula (1) and a structural unit represented by the following formula (3) is excluded.

[Formula 5]

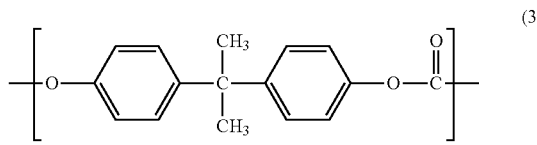
(3)

[1-2] The transparent film according to [1] or [1-1], wherein the structural unit represented by formula (1) is included in a ratio of 70 to 100 mol % with respect to all of the structural units of the polycarbonate resin (A).

[1-3] The transparent film according to any of [1] to [1-2], wherein the polycarbonate resin (A) has a viscosity average molecular weight of 7,000 to 35,000.

[2] The transparent film according to any of [1] to [1-3], wherein the resin composition further includes a polycarbonate resin (B) having a structural unit represented by formula (3).

[Formula 6]

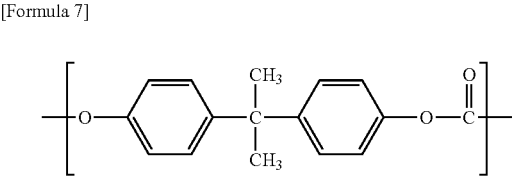
(3)

[2-1] The transparent film according to any of [1] to [1-3], wherein the resin composition further comprises a polycarbonate resin (B) including a structural unit represented by formula (3):

[Formula 7]

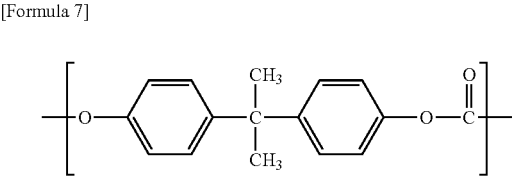
(3)

provided that a case where the polycarbonate resin (B) is a copolymer including a structural unit represented by formula (1) and a structural unit represented by formula (3) is excluded.

[2-2] The transparent film according to [2] or [2-1], wherein the structural unit represented by formula (3) is included in a ratio of 70 to 100 mol % with respect to all of the structural units of the polycarbonate resin (B).

[2-3] The transparent film according to any of [2] to [2-2], wherein the polycarbonate resin (B) has a viscosity average molecular weight of 10,000 to 35,000.

[3] The transparent film according to any of [2] to [2-3], wherein a ratio of the polycarbonate resin (A) to a total mass of the polycarbonate resin (A) and the polycarbonate resin (B) is 10 to 100% by mass.

[4] The transparent film according to any of [1] to [3], wherein the structural unit represented by formula (1) includes a structural unit represented by the following formula (4) or (5).

[Formula 8]

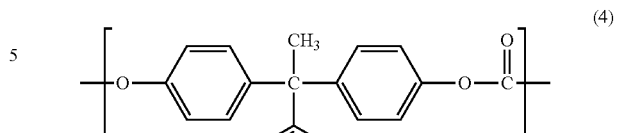
(4)

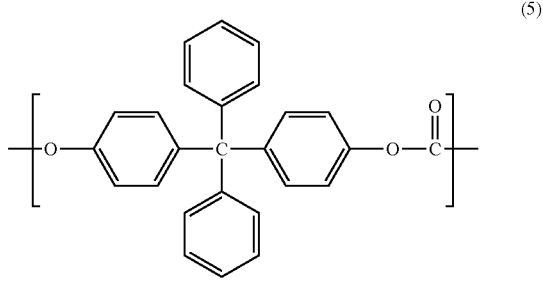
(5)

[5] The transparent film according to any of [1] to [4], wherein the resin composition has a glass transition temperature of 150 to 185° C.

[6] The transparent film according to any of [1] to [5], wherein the resin composition has a shear viscosity at 300° C. and a shear rate of 30 to 250 sec$^{1}$ of 300 to 1200 Pa·s.

[6-1] The transparent film according to any of [1] to [6], wherein the transparent film has a haze of 0 to 1.5% at a thickness of 160 μm.

[7] The transparent film according to any of [1] to [6-1], wherein the transparent film has a thickness of 30 to 200 μm.

[8] The transparent film according to any of [1] to [7], further laminated with a high hardness resin layer having a pencil hardness of H or more.

[9] An optical film comprising the transparent film according to any of [1] to [8].

[10] The transparent film according to any of [1] to [8], wherein the transparent film is a film for a transparent electrode base material.

[11] A transparent electrode comprising the transparent film according to [10] and a transparent electrode layer laminated on the transparent film.

[12] The transparent electrode according to [11], wherein the transparent electrode layer includes one or more of ATO (antimony-doped indium oxide), FTO (fluorine-doped tin oxide), AZO (aluminum-doped zinc oxide), GZO (gallium-doped zinc oxide), ITO (indium tin composite oxide), Ag, Cu, Au, and a carbon nanotube.

[13] The transparent film according to any of [1] to [8], wherein the transparent film is a protective film.

Advantageous Effect of the Invention

The present invention can provide a transparent film in which birefringence is not easily affected by the film forming conditions.

EMBODIMENTS FOR CARRYING OUT THE INVENTION

Embodiments of the present invention will now be described in detail.

The transparent film of the present invention comprises a polycarbonate resin (A) including a structural unit represented by formula (1) and has a photoelastic coefficient of 80×10$^{-2}$ m$^2$/N or less.

[Formula 9]

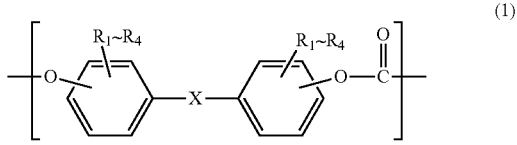

(1)

In formula (1), $R_1$ to $R_4$ are each independently a hydrogen atom, an alkyl group, or an aryl group; and X is a single bond or a group represented by the following formula (2).

[Formula 10]

(2)

In formula (2), $R_5$ and $R_6$ are a hydrogen atom, an alkyl group, or an aryl group; and at least one of $R_5$ and $R_6$ is an aryl group.

As described above, polycarbonate resins have various excellent properties, such as transparency, impact resistance, heat resistance, and dimensional stability, but a polycarbonate resin produced with bisphenol A as a main component tends to have a high photoelastic coefficient. In a resin having a high photoelastic coefficient, birefringence tends to fluctuate depending on the film forming conditions, particularly an external force applied to the resin during film formation (for example, holding pressure during injection, roll pressing pressure during film formation, etc.). For example, when a large external force acts during film formation, the retardation value tends to increase. Therefore, when the pressure acting on the resin differs slightly depending on the position due to the mechanical properties of the film forming machine and the film forming conditions, there arises a problem in that birefringence unevenness occurs in the film, and a uniform film cannot be obtained. In particular, birefringence unevenness tends to cause a problem of poor appearance (rainbow unevenness, etc.).

Such a problem can be solved by the present invention of a transparent film, which uses a polycarbonate resin including a structural unit represented by formula (1) and has a low photoelastic coefficient of the film as a whole. When the photoelastic coefficient is low, birefringence is not easily affected by an external force during film formation. Therefore, according to the present invention, a transparent film having birefringence that is not easily affected by the film forming conditions and that has more uniform physical properties such as birefringence and appearance can be obtained even if the pressure acting on the resin during film formation differs slightly depending on the position. The transparent film of the present invention has a photoelastic coefficient of $80 \times 10^{-12}$ $m^2/N$ or less (for example, 55 to $80 \times 10^{-12}$ $m^2/N$), preferably $75 \times 10^{-12}$ $m^2/N$ or less (for example, 55 to $75 \times 10^{-12}$ $m^2/N$), more preferably $73 \times 10^{-12}$ $m^2/N$ or less (for example, 55 to $73 \times 10^{-12}$ $m^2/N$), and particularly preferably $61 \times 10^{-12}$ $m^2/N$ or less (for example, 55 to $61 \times 10^{-12}$ $m^2/N$).

As will be described in detail later, the transparent film of the present invention, in which the type (structural unit) and the content of the polycarbonate resin composition constituting the transparent film are adjusted, has a photoelastic coefficient value within a preferable range.

Here, the photoelastic coefficient is a value measured at a wavelength of 633 nm in an environment of 23° C. and a relative humidity of 50%. Specifically, a sample film of the polycarbonate resin composition having a width of 1 cm and a length of 6 cm was prepared. Then, using a spectroscopic ellipsometer (M-220, manufactured by JASCO Corporation) under the above environment, the retardation (Re) value in the film plane was measured at a wavelength of 633 nm while applying a stress load (0 to 720 gf) to the film, and the photoelastic coefficient was calculated from the stress and the slope of Re. That is, the value of (retardation (Re) value)×(film width (cm))/(load (gf)) was calculated and used as the photoelastic coefficient. Specifically, the value of the slope of the (approximate) straight line connecting the points indicating each measured value in a graph with the value of the stress load (0 to 720 gf) on the horizontal axis and the above Re value on the vertical axis was used as the photoelastic coefficient ($m^2/N$).

As described above, because the birefringence of the transparent film of the present invention is not easily affected by an external force during film formation, a difference in retardation when the film is formed at different roll pressing pressures can be suppressed to a low level. That is, even if the pressure acting on the resin during film formation differs slightly depending on the position, it is possible to obtain a transparent film having more uniform physical properties, such as birefringence and appearance. For example, an average rate of change of retardation (Re) at a measurement wavelength of 523 nm when the roll pressing pressure during film formation is 5 MPa and 2 MPa of 30% or less (for example, 0 to 30%) and 25% or less (for example, 0 to 25%), 23% or less and the like can be obtained. Here, the average rate of change of retardation (Re) is a value calculated by the following expression.

Average rate of change (%) of retardation (Re)=(Re average value when film is formed at 5 MPa− Re average value when film is formed at 2 MPa)/Re average value when film is formed at 5 MPa In the above expression, as described in the Examples, the Re average value is an average value (measurement wavelength 523 nm) of the retardation values measured at intervals of 0.5 mm in the film width direction.

Depending on the application of the transparent film, post-processing (for example, vapor deposition, sputtering, etc.) for imparting design properties, conductivity, and the like is required. When such post-processing is required, heat resistance is often required. In such a case, it is preferable to use a transparent film having excellent heat resistance. According to the present invention, there can also be provided a transparent film capable of successfully performing a post-processing process requiring such heat resistance. Specifically, according to the present invention, it is possible to provide a transparent film having a glass transition temperature of 150° C. to 185° C. The glass transition temperature can be 155 to 180° C. or 160 to 175° C. Further, the transparent film of the present invention has, in a film of a thickness of 160 μm, a haze of preferably 0.0 to 1.5%, more preferably 0.0 to 1.0%, and particularly preferably 0.0 to 0.3%. By having such a haze value, the transparent film of the present invention can be suitably used in applications requiring transparency.

In the present specification, a mixture of the materials constituting the transparent film of the present invention before film formation is also referred to as a "resin composition". However, the shear viscosity of the resin composition is, when measured at 300° C. and a shear rate of 30 to 250 sec-1, preferably 300 to 1100 Pa·s, more preferably 400 to 800 Pa·s, and particularly preferably 500 to 700 Pa·s. When the shear viscosity is in the above range, it can be said that the resin composition has more suitable fluidity for forming a film on a film.

Each material included in the transparent film of the present invention will now be described in detail.

(1) Polycarbonate Resin (A)

The transparent film of the present invention includes a polycarbonate resin (A) including a structural unit represented by formula (1).

[Formula 11]

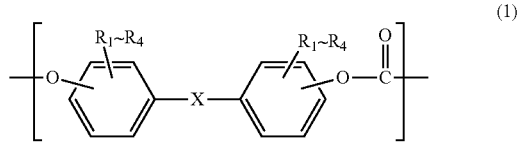
(1)

In formula (1), $R_1$ to $R_4$ are each independently a hydrogen atom, an alkyl group, or an aryl group; and X is a single bond or a group represented by the following formula (2), and preferably is a group represented by the following formula (2).

[Formula 12]

(2)

In formula (2), $R_5$ and $R_6$ are a hydrogen atom, an alkyl group, or an aryl group; and at least one of $R_5$ and $R_6$ is an aryl group.

In formula (1), $R_1$ to $R_4$ represent a substituent on a phenylene group, and are preferably a hydrogen atom, an alkyl group having 1 to 10 carbon atoms, or an aryl group having 6 to 30 carbon atoms. The alkyl group is more preferably an alkyl group having 1 to 6 carbon atoms, and particularly preferably an alkyl group having 1 to 4 carbon atoms. Examples thereof include a methyl group, an ethyl group, an n-propyl group, an isopropyl group, an n-butyl group, an isobutyl group, a t-butyl group, and the like. The aryl group is more preferably an aryl group having 6 to 18 carbon atoms, and particularly preferably an aryl group having 6 to 12 carbon atoms. Examples thereof include a phenyl group, a naphthyl group, and a biphenyl group. These alkyl and aryl groups may further have a substituent. $R_1$ to $R_4$ are preferably a hydrogen atom or an alkyl group having 1 to 4 carbon atoms, more preferably a hydrogen atom, a methyl group, or an ethyl group, and particularly preferably all of $R_1$ to $R_4$ are a hydrogen atom.

Examples of the alkyl group and the aryl group of $R_5$ and $R_6$ in formula (2) include the same examples as those described for $R_1$ to $R_4$ above. Preferably, one of $R_5$ and $R_6$ is an alkyl group and the other is an aryl group, or both of $R_5$ and $R_6$ are an aryl group.

Specifically, examples of the structural unit represented by formula (1) include structural units derived from 4,4'-biphenol, 2,4'-biphenol, 2,2'-biphenol, 3,3'-dimethyl-4,4'-biphenol, 3,3'-diphenyl-4,4'-biphenol, 1,1-bis(4-hydroxyphenyl)-1-phenylethane, 1,1-bis(4-hydroxy-3-methylphenyl)-1-phenylethane, 1,1-bis(4-hydroxy-3-phenylphenyl)-1-phenylethane, bis(4-hydroxyphenyl)diphenylmethane, bis(4-hydroxy-3-methylphenyl)diphenylmethane, bis(4-hydroxy-3-phenylphenyl)diphenylmethane, bis(4-hydroxyphenyl)phenylmethane, bis(4-hydroxyphenyl)diphenylmethane, bis(4-hydroxy-3-methylphenyl)diphenylmethane, bis(4-hydroxy-3-phenylphenyl)diphenylmethane, 1,1-bis(4-hydroxyphenyl)-1-naphthylethane, and the like.

The structural unit represented by formula (1) preferably includes a 1,1-bis(4-hydroxyphenyl)-1-phenylethane (a structural unit represented by the following formula (4)) or bis(4-hydroxyphenyl)diphenylmethane (a structural unit represented by the following formula (5)).

[Formula 13]

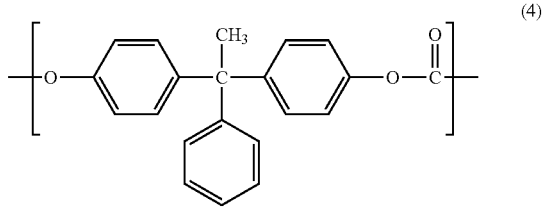
(4)

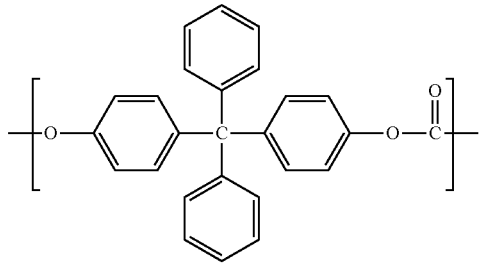
(5)

The structural unit represented by formula (1) is, with respect to all of the structural units of the polycarbonate resin (A), preferably included in a ratio of 70 to 100 mol %, more preferably 80 to 100 mol %, and particularly preferably 95 to 100 mol %. By including the structural unit in such a ratio, the transparent film can be sufficiently provided with the preferable properties described above due to the structural unit represented by formula (1). The polycarbonate resin (A) may include any structural unit other than the structural unit represented by formula (1), but it is preferable that the polycarbonate resin (A) be composed of only the structural unit represented by formula (1). The other structural unit may be any structural unit that can be included in a conventional polycarbonate resin. The polycarbonate resin (A) may include one or two or more of the structural unit represented by formula (1).

The polycarbonate resin (A) has a viscosity average molecular weight of preferably 7,000 to 35,000, more preferably 8,000 to 28,000, and particularly preferably 12,000 to 23,000. By setting the molecular weight in such a range, the resin composition can be provided with fluidity suitable for film molding.

The polycarbonate resin (A) can be produced by reacting a monomer for deriving a structural unit represented by formula (1) and optionally a monomer for deriving another structural unit with a carbonic acid ester-forming compound.

Specifically, the polycarbonate resin (A) can be produced by a known method used in producing polycarbonate resins, for example, a direct reaction between a bisphenol and phosgene (phosgene method), or a transesterification reaction between a bisphenol and bisaryl carbonate (transesterification method), or the like.

Examples of the carbonic acid ester-forming compound include phosgene and bisaryl carbonates such as diphenyl carbonate, di-p-tolyl carbonate, phenyl-p-tolyl carbonate, di-p-chlorophenyl carbonate, and dinaphthyl carbonate.

These compounds may be used singly or in combinations of two or more.

In the phosgene method, usually, the monomer for deriving the structural unit represented by formula (1) and optionally the monomer for deriving another structural unit are reacted with phosgene in the presence of an acid binder and a solvent. As the acid binder, for example, pyridine or a hydroxide of an alkali metal such as sodium hydroxide or potassium hydroxide, and the like are used. As the solvent, for example, methylene chloride, chloroform and the like are used. Further, in order to promote a polycondensation reaction, it is preferable to add a catalyst such as a tertiary amine like triethylamine or a quaternary ammonium salt, and in order to adjust the degree of polymerization, it is preferable to add a monofunctional group compound such as phenol, p-t-butylphenol, p-cumylphenol, or a long-chain alkyl-substituted phenol. In addition, a small amount of an antioxidant, such as sodium sulfite or hydrosulfite, or a branching agent, such as phloroglucinol or isatin bisphenol may also optionally be added. The reaction temperature is usually in the range of 0 to 150° C., and preferably in the range of 5 to 40° C. The reaction time depends on the reaction temperature, but is usually 0.5 minutes to 10 hours, and preferably 1 minute to 2 hours. Further, it is preferable to keep the pH of the reaction system at 10 or more during the reaction.

On the other hand, in the transesterification method, the monomer for deriving the structural unit represented by formula (1) and optionally the monomer for deriving another structural unit are mixed with a bisaryl carbonate and reacted at a high temperature and reduced pressure. The reaction is usually carried out at a temperature in the range of 150 to 350° C., and preferably in the range 200 to 300° C., and the pressure is finally preferably reduced to 133 Pa or less to distill out of the system the phenols derived from the bisaryl carbonate produced in the transesterification reaction. The reaction time depends on the reaction temperature, how much the pressure is reduced, and the like, but is usually about 1 to 24 hours. The reaction is preferably carried out in an inert gas atmosphere, such as in nitrogen or argon. Further, a molecular weight modifier, an antioxidant, a branching agent, and the like may also optionally be added.

(2) Polycarbonate Resin (B)

The transparent film of the present invention may further include a polycarbonate resin (B) including a structural unit represented by the following formula (3).

[Formula 6]

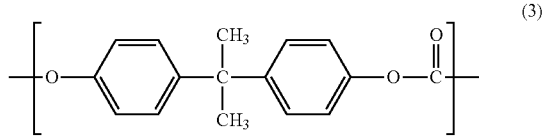

The structural unit represented by formula (3) is, with respect to all of the structural units of the polycarbonate resin (B), preferably included in a ratio of 80 to 100 mol %, more preferably 90 to 100 mol %, and particularly preferably 95 to 100 mol %. By including the polycarbonate resin (B) in such a ratio, the resin composition can be sufficiently provided with fluidity suitable for film formation. The polycarbonate resin (B) is not limited to being composed of only a structural unit represented by formula (3)(bisphenol A), and may include any structural unit other than the structural unit represented by formula (3). However, it is preferable that the polycarbonate resin (B) be composed of only the structural unit represented by formula (3). The other structural unit may be any structural unit that can be included in a conventional polycarbonate resin.

The polycarbonate resin (B) has a viscosity average molecular weight of preferably 10,000 to 35,000, more preferably 22,000 to 35,000, and particularly preferably 25,000 to 35,000. By setting the molecular weight in such a range, it is possible to secure fluidity suitable for film molding, and at the same time, and impart mechanical properties such as bending resistance and impact resistance, which are important in the processes after film molding, to the film.

The ratio of the polycarbonate resin (A) to the total mass of the polycarbonate resin (A) and the polycarbonate resin (B) is preferably 10 to 100% by mass, more preferably 30 to 100% by mass, and particularly preferably 50 to 100% by mass. Further, the upper limit of the preferable range of the ratio of the polycarbonate resin (A) to the total mass is not limited to 100% by mass, and may be, for example, 90% by mass, 80% by mass, 70% by mass, or 60% by mass. The ratio of the polycarbonate resin (A) to the total mass may be, for example, 10 to 90% by mass, 10 to 80% by mass, 10 to 70% by mass, 10 to 60% by mass, and the like, or may be 30 to 90% by mass, 30 to 80% by mass, 30 to 70% by mass, 30 to 60% by mass, and the like, or may be 50 to 90% by mass, 50 to 80% by mass, 50 to 70% by mass, 50 or 60% by mass, and the like. By including the polycarbonate resin (A) and the polycarbonate resin (B) in the above-mentioned ratios, a resin composition can be obtained that has a sufficient level of the above-described properties of the polycarbonate resin (A) as well as has good fluidity derived from the polycarbonate resin (B). As the ratio of the polycarbonate resin (A) in the resin composition increases, the photoelastic coefficient tends to decrease, the impact on birefringence by an external force during film formation tends to decrease, and the glass transition temperature tends to increase. Therefore, it is more preferable that the proportion of the polycarbonate resin (A) be larger than the proportion of the polycarbonate resin (B).

As the resin composition constituting the transparent film, a copolymer including the structural unit represented by formula (1) and the structural unit represented by the above formula (3) in the same polymer chain may be used. The ratio of the structural unit represented by formula (1) to the total number of moles of the structural unit represented by formula (1) and the structural unit represented by formula (3) in such a copolymer is the same as the ratio of the polycarbonate resin (A) to the total mass of the polycarbonate resin (A) and the polycarbonate resin (B) described above.

However, in the case of including the polycarbonate resin (B), it is preferable that the polycarbonate resin (B) be included in the resin composition as a blend with the polycarbonate resin (A), that is, the resin composition constituting the transparent film is preferably a mixture of the polycarbonate resin (A) and the polycarbonate resin (B).

In a resin composition mainly using a mixture of the polycarbonate resin (A) and the polycarbonate resin (B), it is possible to broaden the range of selection of the molecular weights of the polycarbonate resin (A) and the polycarbonate resin (B). Further, since molecular weight is also related to glass transition temperature and fluidity (viscosity), these properties can be easily adjusted in the resin composition which is a mixture.

Therefore, the proportion of the above-described copolymer in the resin composition is preferably low, for example, 30% by mass or less, preferably 20% by mass or less, and more preferably 10% by mass or less in the resin composition. Further, it is preferable that the copolymer including the structural unit represented by formula (1) and the structural unit represented by formula (3) not be included in the resin composition.

As the polycarbonate resin (B), a commercially available polycarbonate resin can be used, or a polycarbonate resin produced by the same method as described above for the polycarbonate resin (A) can be used.

The resin composition preferably has a glass transition temperature of 150 to 185° C., more preferably 155 to 180° C., and further preferably 160 to 175° C.

The resin composition has a shear viscosity at 300° C. and a shear rate of 30 to 250 sec$^{-1}$ of preferably 300 to 1200 Pa·s, preferably 400 to 1150 Pa·s, and further preferably 500 to 1100 Pa·s.

(3) Other Components

The resin composition may contain various additives within a range that does not deviate from the spirit of the present invention. Examples of the additive include at least one additive selected from the group consisting of a heat stabilizer, an antioxidant, a flame retardant, a flame retardant aid, an ultraviolet absorber, a mold release agent, and a colorant.

Further, an antistatic agent, a fluorescent whitening agent, an antifogging agent, a fluidity improving agent, a plasticizer, a dispersant, an antibacterial agent, and the like may be added as long as the desired physical properties are not significantly impaired.

Examples of the heat stabilizer include phenol-based, phosphorus-based, and sulfur-based heat stabilizers. Specifically, examples may include phosphorus oxo acids, such as phosphoric acid, phosphonic acid, phosphorous acid, phosphinic acid, and polyphosphoric acid; acidic pyrophosphate metal salts, such as acidic sodium pyrophosphate, acidic potassium pyrophosphate, and acidic calcium pyrophosphate; phosphates of Group 1 or Group 10 metals, such as potassium phosphate, sodium phosphate, cesium phosphate, and zinc phosphate; organic phosphate compounds, organic phosphite compounds, organic phosphonite compounds, and the like. Alternatively, examples include at least one selected from the group consisting of a phosphite ester compound (a), phosphite (b), and tetrakis(2,4-di-tert-butylphenyl)-4,4'-biphenylene-di-phosphonite (c) including in the molecule at least one ester group esterified by a phenol and/or a phenol having at least one alkyl group having 1 to 25 carbon atoms. Specific examples of the phosphite ester compound (a) include trioctyl phosphite, trioctadecyl phosphite, tridecyl phosphite, trilauryl phosphite, tristearyl phosphite, triphenyl phosphite, tris(monononylphenyl) phosphite, tris(mononyl/dinonyl-phenyl) phosphite, trisnonylphenyl phosphite, tris(octylphenyl) phosphite, tris(2,4-di-tert-butylphenyl) phosphite, trinonylphosphite, didecylmonophenyl phosphite, dioctylmonophenyl phosphite, diisopropylmonophenyl phosphite, monobutyldiphenyl phosphite, monodecyldiphenyl phosphite, bis(2,4-di-tert-butylphenyl) pentaerythritol phosphite, bis(2,6-di-tert-butyl-4-methylphenyl) pentaerythritol phosphite, monooctyldiphenyl phosphite, distearyl pentaerythritol diphosphite, tricyclohexyl phosphite, diphenyl pentaerythritol diphosphite, bis(2,6-di-tert-butyl-4-methylphenyl) pentaerythritol diphosphite, 2,2-methylenebis(4,6-di-tert-butylphenyl) octylphosphite, bis(nonylphenyl) pentaerythritol diphosphite, bis(2,4-di-tert-butylphenyl) pentaerythritol diphosphite, bis(2,6-di-tert-butyl-4-ethylphenyl) pentaerythritol diphosphite, and the like. These may be used singly or in combinations of two or more.

Specific examples of the organic phosphite compound include "ADEKA STAB 1178", "ADEKA STAB 2112" and "ADEKA STAB HP-10" manufactured by Adeka Corporation; "JP-351" and "JP-360", and "JP-3CP" manufactured by Johoku Chemical Co., Ltd.; "Irgafos 168" manufactured by Ciba Specialty Chemicals, and the like.

Examples of the organic phosphate include trimethyl phosphate, triethyl phosphate, tributyl phosphate, trioctyl phosphate, triphenyl phosphate, tricresyl phosphate, tris (nonylphenyl) phosphate, 2-ethylphenyldiphenyl phosphate, and the like.

In the case of adding the heat stabilizer, the added amount is, with respect to 100 parts by mass of the polycarbonate resin in the resin composition (when a plurality of polycarbonate resins are included, the total mass of the polycarbonate resins), preferably 0.001 to 1 part by mass, more preferably 0.01 to 0.7 parts by mass, and particularly preferably 0.03 to 0.5 parts by mass. By adding in such an amount, a sufficient heat stabilizing effect can be obtained.

Examples of the antioxidant include a phenol-based antioxidant, a hindered phenol-based antioxidant, a bisphenol-based antioxidant, a polyphenol-based antioxidant, and the like. Specifically, examples may include 2,6-di-tert-butyl-4-methylphenol, tris(3,5-di-tert-butyl-4-hydroxybenzyl) isocyanurate, n-octadecyl-3-(3',5'-di-tert-butyl-4'-hydroxyphenyl) propionate, tetrakis[methylene-3-(3,5-di-tert-butyl-4-hydroxyphenyl)propionate] methane, 4,4'-butylidenebis-(3-methyl-6-tert-butylphenol), triethylene glycol-bis[3-(3-tert-butyl-4-hydroxy-5-methylphenyl)propionate], 3,9-bis{2-[3-(3-tert-butyl-4-hydroxy-5-methylphenyl)propionyloxy]-1, 1-dimethylethyl}-2,4,8,10-tetraoxaspiro[5,5]undecane, pentaerythritol tetrakis[3-(3,5-di-tert-butyl-4-hydroxyphenyl)propionate], thiodiethylene bis[3-(3,5-di-tert-butyl-4-hydroxyphenyl)propionate], N,N'-hexane-1,6-diyl bis[3-(3, 5-di-tert-butyl-4-hydroxyphenylpropionamide), 2,4-dimethyl-6-(1-methylpentadecyl) phenol, diethyl [[3,5-bis (1,1-dimethylethyl)-4-hydroxyphenyl]methyl] phosphate, 3,3',3",5,5',5"-hexa-tert-butyl-a,a',a"-(mesitylene-2,4,6-triyl) tri-p-cresol, 4,6-bis(octylthiomethyl)-o-cresol, ethylene bis(oxyethylene) bis[3-(5-tert-butyl-4-hydroxy-m-tolyl) propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazin-2-ylamino) phenol, and the like. Specific examples of the phenol-based antioxidant include "Irganox (registered trademark) 1010" and "Irganox (registered trademark) 1076" manufactured by Ciba Specialty Chemicals Co., Ltd.; "ADEKA STAB AO-50", "ADEKA STAB AO-60," manufactured by Adeka Corporation and the like.

In the case of adding the antioxidant, the added amount is, with respect to 100 parts by mass of the polycarbonate resin in the resin composition (when a plurality of polycarbonate resins are included, the total mass of the polycarbonate resins), preferably 0.001 to 1 part by mass, and more preferably 0.01 to 0.5 parts by mass. By adding in such an amount, a sufficient antioxidant effect can be obtained.

Examples of the flame retardant include an organic sulfonic acid metal salt and the like. Examples of the organic sulfonic acid metal salt include an aliphatic sulfonic acid metal salt and an aromatic sulfonic acid metal salt. These may be used singly or in combinations of two or more. Further, as the metal salt, an alkali metal salt and an alkaline earth metal salt are preferable. Examples of the alkali metal include sodium, lithium, potassium, rubidium, and cesium. Examples of the alkaline earth metal include calcium, strontium, and the like. An alkali metal such as sodium, potassium, rubidium, or cesium is more preferable, and sodium or potassium is particularly preferable. By employing such a metal, it is possible to obtain effects such as effectively promoting the formation of a carbonized layer during combustion and maintaining high transparency.

Examples of the aliphatic sulfonic acid salt include preferably a fluoroalkane-sulfonic acid metal salt, and more preferably a perfluoroalkane-sulfonic acid metal salt.

Further, examples of the fluoroalkane-sulfonic acid metal salt include an alkali metal salt and an alkaline earth metal salt, and an alkali metal salt is preferable. The number of carbon atoms of the fluoroalkane sulfonic acid metal salt is preferably 1 to 8, and more preferably 2 to 4. By setting the number of carbon atoms in such a range, an effect is obtained of enabling a high transparency to be maintained. Specific preferable examples of the fluoroalkane-sulfonic acid metal salt include sodium perfluorobutane-sulfonate, potassium perfluorobutane-sulfonate, sodium perfluoroethane-sulfonate, potassium perfluoroethane-sulfonate, and the like.

Examples of the aromatic sulfonic acid metal salt include an alkali metal salt and an alkaline earth metal salt, and an alkali metal salt is preferable. Specific examples of the aromatic sulfonic acid alkali metal salt include sodium 3,4-dichlorobenzenesulfonate, sodium 2,4,5-trichlorobenzenesulfonate, sodium benzenesulfonate, sodium diphenylsulfone-3-sulfonate, potassium diphenylsulfone-3-sulfonate, sodium 4,4'-dibromodiphenylsulfone-3-sulfonate, potassium 4,4'-dibromophenylsulfone-3-sulfonate, disodium diphenylsulfone-3,3'-disulfonate, dipotassium diphenylsulfone-3,3'-disulfonate, sodium dodecylbenzenesulfonate, potassium dodecylbenzenesulfonate, potassium p-toluenesulfonate, potassium p-styrenesulfonate, and the like.

Preferably, particularly from the viewpoint of improving transparency, the organic sulfonic acid metal salt is potassium diphenylsulfone-3-sulfonate, potassium p-toluenesulfonate, potassium p-styrenesulfonate acid, or potassium dodecylbenzenesulfonate acid, and more preferably is potassium diphenylsulfone-3-sulfonate.

A flame retardant other than the organic sulfonic acid metal salt may be added, and examples thereof include a silicone compound. The silicone compound preferably has a phenyl group in the molecule. By having a phenyl group, the dispersibility of the silicone compound in the polycarbonate is improved, and the transparency and flame retardancy are improved. The silicone compound preferably has a mass average molecular weight of 450 to 5000, more preferably 750 to 4000, further preferably 1000 to 3000, and particularly preferably 1500 to 2500. By setting the mass average molecular weight to 450 or more, film production becomes easier, adaptation to industrial production becomes easier, and the heat resistance of the silicone compound is less likely to decrease. Further, by setting the mass average molecular weight of the silicone compound to 5000 or less, the dispersibility in the resin composition is improved, and deterioration in the flame retardancy of the film and in the mechanical properties tend to be more effectively suppressed.

In the case of adding the flame retardant aid, the added amount is, with respect to 100 parts by mass of the polycarbonate resin in the resin composition (when a plurality of polycarbonate resins are included, the total mass of the polycarbonate resins), preferably 0.1 to 7.5 parts by mass, and more preferably 0.2 to 5.0 parts by mass. By adding in such an amount, sufficient flame retardancy can be obtained, and the occurrence of appearance defects can also be suppressed.

Examples of the ultraviolet absorber include inorganic ultraviolet absorbers, such as cerium oxide and zinc oxide, as well as organic ultraviolet absorbers, such as a benzotriazole compound, a benzophenone compound, a salicylate compound, a cyanoacrylate compound, a triazine compound, an oxanilide compound, a malonic acid ester compound, a hindered amine compound, and a phenyl salicylic acid compound. Among these, a benzotriazole-based or benzophenone-based organic ultraviolet absorber is preferable. In particular, specific examples of the benzotriazole compound include 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole), 2-(2'-hydroxy-3',5'-di-tert-amyl)-benzotriazole, 2-(2'-hydroxy-5'-tert-octylphenyl) benzotriazole, 2,2'-methylenebis[4-(1,1,3,3-tetramethylbutyl)-6-(2N-benzotriazol-2-yl)phenol], 2-(4,6-diphenyl-1,3,5-triazin-2-yl)-5-[(hexyl)oxy]-phenol, 2-[4,6-bis(2,4-dimethylphenyl)-1,3,5-triazin-2-yl]-5-(octyloxy) phenol, 2,2'-(1,4-phenylene)bis[4H-3,1-benzoxazine-4-one], [(4-methoxyphenyl)-methylene]-propanedioic acid-dimethylester, 2-(2H-benzotriazol-2-yl)-p-cresol, 2-(2H-benzotriazol-2-yl)-4,6-bis(1-methyl-1-phenylmethyl) phenol, 2-[5-chloro(2H)-benzotriazol-2-yl]-4-methyl-6-(tert-butyl)phenol, 2,4-di-tert-butyl-6-(5-chlorobenzotriazol-2-yl)phenol, 2-(2H-benzotriazol-2-yl)-4-(1,1,3,3-tetrabutyl)phenol, 2,2'-methylenebis [6-(2H-benzotriazol-2-yl)-4-(1,1,3,3-tetrabutyl)phenol], a condensation product of [methyl-3-[3-tert-butyl-5-(2H-benzotriazol-2-yl)-4-hydroxyphenyl]propionate-polyethylene glycol], and the like. Two or more of these may be used in combination. Among the above examples, 2-(2'-hydroxy-5'-tert-octylphenyl)benzotriazole and 2,2'-methylene-bis[4-(1,1,3,3-tetramethylbutyl)-6-(2N-benzotriazole 2-yl)phenol] are preferable. Further, specific examples of the benzophenone-based ultraviolet absorber include 2,4-dihydroxy-benzophenone, 2-hydroxy-4-methoxy-benzophenone, 2-hydroxy-4-n-octoxy-benzophenone, 2-hydroxy-4-dodecyloxy-benzophenone, 2-hydroxy-4-octadecyloxy-benzophenone, 2,2'-dihydroxy-4-methoxy-benzophenone, 2,2'-dihydroxy-4,4'-dimethoxy-benzophenone, 2,2',4,4'-tetrahydroxy-benzophenone, and the like. Further, specific examples of the phenyl salicylic acid-based ultraviolet absorber include phenyl salicylate, 4-tert-butyl-phenyl salicylate, and the like. In addition, specific examples of the triazine-based ultraviolet absorber include 2-(4,6-diphenyl-1,3,5-triazin-2-yl)-5-[(hexyl)oxy]-phenol, 2-[4,6-bis(2,4-dimethylphenyl)-1,3,5-triazin-2-yl]-5-(octyloxy)phenol, and the like. Further, specific examples of the hindered amine-based ultraviolet absorber include bis(2,2,6,6-tetramethylpiperidin-4-yl)sebacate and the like.

In the case of adding the ultraviolet absorber, the added amount is, with respect to 100 parts by mass of the polycarbonate resin in the resin composition (when a plurality of polycarbonate resins are included, the total mass of the polycarbonate resins), preferably 0.01 to 3 parts by mass, and more preferably 0.1 to 1 part by mass. By adding in such an amount, excellent weather resistance is obtained, and contamination of the metal mold or cooling roll due to the occurrence of mold deposits and the like can also be suppressed.

Examples of the mold release agent include a carboxylic acid ester, a polysiloxane compound, paraffin wax (polyolefin based), and the like. Specifically, examples may include at least one compound selected from the group consisting of an aliphatic carboxylic acid, an ester of an aliphatic carboxylic acid and an alcohol, an aliphatic hydrocarbon compound having a number average molecular weight of 200 to 15,000, and a polysiloxane-based silicone oil. Examples of the aliphatic carboxylic acid include saturated or unsaturated aliphatic monovalent, divalent, or trivalent carboxylic acids. Here, "aliphatic carboxylic acid" also includes an alicyclic carboxylic acid. Among these, preferable aliphatic carboxylic acids include a monovalent or divalent carboxylic acid having 6 to 36 carbon atoms, and an aliphatic saturated monovalent carboxylic acid having 6 to 36 carbon atoms is more preferable. Specific examples of the aliphatic carboxylic acid include palmitic acid, stearic acid, valeric acid, caproic acid, capric acid, lauric acid, araquinic acid, behenic acid, lignoseric acid, cerotic acid, melissic acid, tetratriacontanoic acid, montanic acid, glutaric acid, adipic acid, azelaic acid, and the like. Specific examples of the ester of an aliphatic carboxylic acid and an alcohol include beeswax (a mixture containing myricyl palmitate as a main component), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, pentaerythritol tetrastearate, and the like. Examples of the aliphatic hydrocarbon having a number average molecular weight of 200 to 15,000 include liquid paraffin, paraffin wax, microwax, polyethylene wax, Fischer-Tropsch wax, an α-olefin oligomer having 3 to 12 carbon atoms, and the like. Here, "aliphatic hydrocarbon" also includes an alicyclic hydrocarbon. Further, these hydrocarbon compounds may be partially oxidized. As such a compound, a partial oxide of paraffin wax, polyethylene wax, or polyethylene wax is preferable, and a partial oxide of paraffin wax or polyethylene wax is more preferable. The number average molecular weight is preferably 200 to 5000. These aliphatic hydrocarbons may be a single substance or a mixture of a plurality of substances having various compositions and molecular weights such that the number average molecular weight of the main components is within the above-described range. Examples of the polysiloxane-based silicone oil include dimethyl silicone oil, phenyl methyl silicone oil, diphenyl silicone oil, fluorinated alkyl silicone, and the like. Only one type of these release agents may be used, or two or more types may be used in combination.

In the case of adding the mold release agent, the added amount is, with respect to 100 parts by mass of the polycarbonate resin in the resin composition (when a plurality of polycarbonate resins are included, the total mass of the polycarbonate resins), preferably 0.001 to 2 parts by mass, and more preferably 0.01 to 1 part by mass. By adding in such an amount, sufficient mold releasability can be obtained, and deterioration in hydrolysis resistance and contamination of the film forming machine can also be suppressed, for example.

As the colorant, a dye or a pigment can be used. Examples thereof include an inorganic pigment, an organic pigment, and an organic dye. Examples of the inorganic pigment include: sulfide pigments, such as carbon black, cadmium red, and cadmium yellow; silicate pigments, such as ultramarine blue; oxide pigments such as titanium oxide, zinc oxide, red iron oxide, chromium oxide, iron black, titanium yellow, zinc-iron brown, titanium cobalt green, cobalt green, cobalt blue, copper-chromium black, and copper-iron black; chromic acid pigments, such as chrome yellow and molybdate orange; ferrocyanide pigments such as iron blue, and the like. Examples of the organic pigment and the organic dye include: phthalocyanine dyes and pigments, such as copper phthalocyanine blue and copper phthalocyanine green; azo dyes and pigments, such as nickel azo yellow; condensed polycyclic dyes and pigments, such as thioindigo, perinone, perylene, quinacridone, dioxazine, isoindolinone, and quinophthalone dyes and pigments; quinoline-based, anthraquinone-based, heterocyclic, and methyl-based dyes and pigments; and the like. Among these, from the viewpoint of thermal stability, titanium oxide, carbon black, cyanine-based, quinoline-based, anthraquinone-based, phthalocyanine-based dyes and pigments and the like are preferable. In addition, only one type of colorant may be used, or two or more types may be used in combination. Further, as the colorant, in order to improve handleability during film formation and to improve dispersibility in the resin composition, a masterbatch obtained by mixing a polystyrene resin, a polycarbonate resin, and an acrylic resin with the colorant may be used.

In the case of adding the colorant, the added amount is, with respect to 100 parts by mass of the polycarbonate resin in the resin composition (when a plurality of polycarbonate resins are included, the total mass of the polycarbonate resins), preferably 5 parts by mass or less, more preferably 3 parts by mass or less, and particularly preferably 2 parts by mass or less. By adding in such an amount, good impact resistance can be maintained.

The transparent film of the present invention may optionally include a resin other than the above-described polycarbonate resin. Examples of such other resins include a polycarbonate resin other than the polycarbonate resins (A) and (B); a thermoplastic polyester resin such as a polyethylene terephthalate resin (PET resin), polytrimethylene terephthalate (PTT resin), and a polybutylene terephthalate resin (PBT resin); a styrene resin such as a polystyrene resin (PS resin), a high impact polystyrene resin (HIPS), an acrylonitrile-styrene copolymer (AS resin), and a methyl methacrylate-styrene copolymer (MS resin); an elastomer such as a core/shell type elastomer or a polyester elastomer such as a methyl methacrylate-acrylic rubber-styrene copolymer (MAS); a polyolefin resin such as a cyclic cycloolefin resin (COP resin) and a cyclic cycloolefin (COP) copolymer resin; a polyamide resin (PA resin); a polyimide resin (PI resin); a polyetherimide resin (PEI resin); a polyurethane resin (PU resin); a polyphenylene ether resin (PPE resin); a polyphenylene sulfide resin (PPS resin); a polysulfone resin (PSU resin); an acrylic resin such as a polymethylmethacrylate resin (PMMA resin); polycaprolactone, and the like.

In the case of adding another resin, the added amount is, with respect to the total mass of all the resins included in the resin composition, preferably 10% by mass or less, and more preferably 1% by mass or less. By adding in such an amount, there is a smaller influence on the effects of the present invention.

A resin pellet can be obtained by molding a resin composition obtained by mixing the above-described materials. Examples of the method include a well-known strand-type cold-cut method (a method in which a resin composition that has been melted is formed into a strand shape, cooled, and then cut into a predetermined shape to form pellets) or a hot-cut method carried out in air (a method in which a resin composition that has been melted is cut into pellets before touching water in the air), and a hot-cut method carried out in water (a method in which a resin composition that has been melted is cut in water and in simultaneously cooled to form pellets). The obtained resin pellets are preferably dried using a hot-air drying oven, a vacuum drying oven, a dehumidifying drying oven, or the like.

(4) Transparent Film

The transparent film of the present invention can be produced by appropriately using a known film forming method, but specifically, extrusion molding, cast molding, or the like is preferably used. An example of extrusion molding is a method in which pellets, flakes, or a powder of a resin composition to which additives have optionally been added are melted and kneaded with an extruder, then extruded from a T-die or the like to obtain a semi-molten sheet, which is cooled and solidified while sandwiching with a polishing roll or the like to obtain a film. The extruder may be a single-screw extruder or a twin-screw extruder, and can be vented or non-vented.

An example of cast molding is a method in which the resin composition is thoroughly dissolved in a solvent, the obtained solution is cast on a support to form a film-like cast film, the cast film is dried by heating or the like to obtain a film. In this case, any solvent can be used as long as a cast film can be formed, but for example, methylene chloride, dioxolane, and the like are preferably used.

The thickness of the film can be appropriately adjusted according to the application, but the thickness is preferably 30 to 200 μm, more preferably 40 to 180 μm, and particularly preferably 50 to 170 μm. With such a thickness, it is possible to obtain a film having excellent mechanical properties such as flexibility and rigidity, and good handling during secondary processing.

Further, another resin layer can be laminated on the transparent film of the present invention to obtain a laminated film composed of a plurality of resin layers. The other resin layer may be one layer or a plurality of layers, and can be arranged on one side or both sides of the transparent film. Further, an additional layer may be present between the transparent film and the other resin layer. As the resin included in the other resin layer, the resins described above as another resin that can be added to the resin composition can be used, and a high hardness resin having a pencil hardness of H or more is preferable. Using a high hardness resin having a pencil hardness of H or more enables hardness to be imparted to the laminated film. In addition, effects can be obtained such as, for example, scratch prevention during transportation when performing secondary processing and easier maintenance of the mechanical properties of the hard coat when further applying a hard coat on the high hardness resin layer. In view of such a background, it can be expected that the range of applications will be expanded by providing the high hardness resin layer. As the resin used for the high hardness resin layer, for example, a thermosetting resin, an energy ray curable resin, and a thermoplastic resin having a pencil hardness of H or more can be used. Examples of the thermoplastic resin include acrylic resin and polycarbonate resin. In the case of using an acrylic resin, specifically, examples thereof include a methyl methacrylate resin (PMMA: also referred to as polymethyl (meth)acrylate) polymerized from methyl methacrylate, a methyl methacrylate-vinylcyclohexane copolymer resin, and a methyl methacrylate-styrene-maleic anhydride copolymer resin. In the case of using a polycarbonate resin, specifically, examples thereof include a high-hardness polycarbonate resin including bisphenol C as a main component.

(5) Applications

The transparent film of the present invention is not limited in terms of its shape, pattern, color, dimensions, or the like, which may be arbitrarily set according to the application thereof. The transparent film of the present invention is useful as an optical film, a base film, a protective film, and the like. Specifically, the transparent film of the present invention can be used in electrical and electronic devices, OA devices, information terminal devices, mechanical parts, home appliances, vehicle parts, building materials, various containers, leisure goods/miscellaneous goods, parts of lighting devices and the like, parts of various household electric products, housings, containers, covers, storage parts, cases of electric appliances, covers and cases for lighting fixtures, and the like. Examples of electrical and electronic devices include personal computers, game machines, television receivers, display devices such as liquid crystal display devices and plasma display devices, printers, copiers, scanners, fax machines, electronic notebooks and PDAs, electronic desk computers, electronic dictionaries, cameras, video cameras, mobile phones, smartphones, tablets, battery packs, recording media drives and readers, mice, key pads, CD players, MD players, portable radio/audio players, and the like. The transparent film of the present invention can also be used in illuminated signboards, liquid crystal backlights, lighting displays, traffic signs, signboards, screens, automobile parts such as reflectors and meter parts, toys, decorative items, and the like.

In particular, the transparent film of the present invention can be used as a film for a transparent electrode base material. Here, the transparent electrode has a transparent electrode layer arranged on one or both surfaces of a transparent base material. An additional layer may be present between the transparent base material and the transparent electrode layer. The transparent film of the present invention can be used as the transparent base material in this transparent electrode. According to one embodiment of the present invention, provided is a transparent electrode including the transparent film of the present invention and a transparent electrode layer laminated on the transparent film. The material of the transparent electrode layer is not particularly limited as long as it has conductivity, but it is preferable to include one or more conductive materials having, as a main component, an oxide conductive material typified by ATO (antimony-doped indium oxide), FTO (fluorine-doped tin oxide), AZO (aluminum-doped zinc oxide), GZO (gallium-doped zinc oxide), and ITO (indium tin composite oxide); a metal material typified by Ag, Cu, and Au, or a carbon nanotube. The transparent electrode can be used in a film sensor for a touch panel, electronic paper, a dye-sensitized solar cell, a touch sensor, and the like.

When manufacturing a transparent electrode, a heat treatment at 140° C. or higher for 30 minutes or longer is often required. In particular, when the transparent electrode layer is an ITO layer, it is difficult to use a conventional polycarbonate-based film as a base material because the conductive performance improves as the annealing treatment is performed at 150° C. or higher for a longer time. In addition, since transparent electrodes are used in sites where the appearance is strictly controlled, such as in touch panel film sensors, polycarbonate films, whose birefringence is easily affected by the film forming conditions, are prone to producing a rainbow pattern, and hence the use of a polycarbonate film is often rejected. When the transparent film of the present invention is used as the base material of a transparent electrode, problems such as those described above can be solved. Moreover, the transparent film of the present invention can be suitably used in foldable displays and the like by utilizing the excellent mechanical properties of the polycarbonate resin.

The transparent film of the present invention can also be used as a protective film for protecting a product, and can be provided on the surface of the product for the purpose of protecting the product from being hit during transportation of the product, for example. The product to be protected is not particularly limited, and the transparent film of the present invention can be used as a film for protecting a transparent electrode like that described above, for example. When the transparent film of the present invention is used as a protective film of a transparent electrode, it is usual to remove the protective film when using the transparent electrode, but the present invention is not limited to a mode of use in which the transparent film is removed in this way. By providing an adhesive layer on one surface of the protective film, the protective film can be attached to the product. Further, it is also possible to improve the slipperiness of the protective film by laminating a layer having an anti-blocking property on the surface opposite to the side on which the adhesive layer is provided. The slipperiness can be improved by providing a texture instead of laminating a layer having an anti-blocking property.

EXAMPLES

The present invention will now be described in detail with reference to examples, but the subject matter of the present invention is not limited thereto.

(Synthesis Example 1: Synthesis of Polycarbonate Resin (A))

34 liters of an 8.0% mass/mass solution of aqueous sodium hydroxide, 5800 g of 1,1-bis(4-hydroxyphenyl)-1-phenylethane (BPAP) (manufactured by Honshu Chemical Industrial Co., Ltd., 20.00 mol), and 10 g of hydrosulfite were charged into a 100 liter reaction vessel and mixed. 22 liters of dichloromethane was added to the resultant mixture, and 2600 g of phosgene was blown therein over 30 minutes while stirring at 15° C.

After the blowing was finished, the reaction solution was emulsified by vigorously stirring for 1 minute, and 240 g of p-tertiary-butylphenol (PTBP, 1.60 mol) was added. After stirring for another 10 minutes, 20 mL of triethylamine was added, and stirring was continued for another 50 minutes.

The obtained liquid was separated into an aqueous phase and an organic phase, and the organic phase was neutralized with phosphoric acid. Washing with water was repeated until the conductivity of the cleaning liquid reached 10 µS/cm or less, to thereby obtain a purified resin liquid. The obtained resin solution was diluted with dichloromethane to adjust to 10.0% mass/mass. The resin solution was added dropwise to warm water maintained at 45° C., and the solvent was removed by evaporation to obtain a white precipitate. The obtained precipitate was filtered off and dried at 120° C. for 24 hours to obtain a powder of the polycarbonate resin (A). The polycarbonate resin (A) contained a structural unit represented by the above formula (4) (a structural unit derived from 1,1-bis(4-hydroxyphenyl)-1-phenylethane (BPAP)) as a main component (bisphenol AP). The viscosity average molecular weight of the polycarbonate resin (A) was 12,000.

Example 1

The powder of the polycarbonate resin (A) produced in Synthesis Example 1 was melt-kneaded with a twin-screw extruder equipped with a vent and extruded into a film. The film was dropped between a first cooling roll and a second cooling roll of a film forming machine having three cooling rolls arranged perpendicularly to the molding direction, and the film was pressure-bonded by those rolls to obtain a film having a width of 250 mm and a thickness of 160 µm. At that time, two types of samples were obtained, one in which the pressing pressure of the first cooling roll and the second cooling roll was 5 kPa and the other in which the pressing pressure was 2 kPa.

Example 2

Using a blender, 5.0 kg of the polycarbonate resin (A) produced in Synthesis Example 1 and 5.0 kg of E-2000F (a bisphenol A type polycarbonate manufactured by Mitsubishi Engineering-Plastics Corporation) having a viscosity average molecular weight of 27500, which is the polycarbonate resin (B) including a structural unit represented by the above formula (3), were stirred and uniformly mixed. Using the obtained powder, a film was prepared in the same manner as in Example 1.

Example 3

Using a blender, 3.0 kg of the polycarbonate resin (A) produced in Synthesis Example 1 and 7.0 kg of E-2000F (manufactured by Mitsubishi Engineering-Plastics Corporation) having a viscosity average molecular weight of 27500 were stirred and uniformly mixed. Using the obtained powder, a film was prepared in the same manner as in Example 1.

Example 4

Using a blender, 1.0 kg of the polycarbonate resin (A) produced in Synthesis Example 1 and 9.0 kg of E-2000F (manufactured by Mitsubishi Engineering-Plastics Corporation) having a viscosity average molecular weight of 27500 were stirred and uniformly mixed. Using the obtained powder, a film was prepared in the same manner as in Example 1.

Comparative Example 1

A film was prepared in the same manner as in Example 1 using 10.0 kg of E-2000F (manufactured by Mitsubishi Engineering-Plastics Corporation) having a viscosity average molecular weight of 27500.

Comparative Example 2

A film was prepared in the same manner as in Example 1 using 10.0 kg of the polycarbonate resin H-4000F (manufactured by Mitsubishi Engineering-Plastics Corporation) having a viscosity average molecular weight of 16000.

The physical properties of the resins and films of the examples and comparative examples were evaluated as follows.

(1) Shear Viscosity

The resins of the examples and comparative examples were charged into a Capillograph B1 manufactured by Toyo Seiki Co., Ltd., the resins were extruded at 300° C. from a nozzle hole (orifice) having a length of 10 mm and a diameter of 1.0 mm, and the shear viscosity at a shear rate of 30 to 250 sec$^{-1}$ was measured.

(2) Glass Transition Temperature

The glass transition temperature of the resins of the Examples and Comparative Examples was measured with an EXTAR DSC7020 manufactured by Hitachi High-Tech Science Corporation. Approximately 10 mg of the object to be measured was placed in a non-sealed aluminum container, heated to 300° C. at a heating rate of 5° C./min in a nitrogen gas stream, and then the temperature was lowered to 40° C. The temperature was raised again under the same conditions to obtain a DSC curve. A tangent line was drawn on the DSC curve between two baselines before and after transition (a glass state baseline and a molten state baseline), and the temperature at the intersection of the tangent line and the baseline on the glass state side was used as the glass transition temperature.

(3) Photoelastic Coefficient

The films obtained in the examples and comparative examples were annealed. The films after the annealing treatment were subjected to a stress load (0 to 720 gf) using an ellipsometer M-220 manufactured by JASCO Corporation in an environment of 23° C. and a relative humidity of 50% to measure the retardation (Re) value in the film plane at a wavelength of 633 nm. Then, the photoelastic coefficient was calculated from the stress and the Re slope.

(4) Haze

The haze of the films obtained in the examples and comparative examples was measured using an HM-150 manufactured by Murakami Color Research Laboratory in accordance with JIS K7136.

(5) Retardation (Re)

Using a WPA-100 manufactured by Photonics Lattice Inc., the retardation in the film width direction of the films produced in the examples and comparative examples (roll pressing pressures of 5 MPa and 2 MPa, respectively) was measured at 0.5 mm intervals by selecting a measurement wavelength of 523 nm. The average value of the retardation values obtained for each sample was calculated and used as the "Re average value". Further, for each of the examples and comparative examples, the difference between the Re average value of the sample having a roll pressing pressure of 5 MPa and the sample having a roll pressing pressure of 2 MPa (5 MPa Re average value−2 MPa Re average value) was calculated and used as the "Re average change amount". In addition, the ratio of the Re average change amount to the Re average value of the 5 MPa sample (Re average change amount/5 MPa Re average value) was calculated and used as the "Re average change rate".

The evaluation results of the physical properties are shown in Table 1 below.

TABLE 1

| | Resin (A): (main component: bisphenol AP) (% by mass) | Resin (B): (main component: bisphenol A) (% by mass) | Shear viscosity (Pa · s) | Photoelastic coefficient ($10^{-12}$m$^2$/N) | Glass transition temperature (° C.) | Haze (%) | Roll pressing pressure (MPa) | Re average value (nm) | Re average change amount (nm) | Re average change rate (%) |
|---|---|---|---|---|---|---|---|---|---|---|
| Example 1 | 100 | 0 | 500 | 57.1 | 168 | 0.1 | 5 | 119 | 25 | 21 |
| | | | | | | | 2 | 96 | | |
| Example 2 | 50 | 50 | 760 | 61.0 | 156 | 0.1 | 5 | 156 | 39 | 25 |
| | | | | | | | 2 | 117 | | |
| Example 3 | 30 | 70 | 900 | 72.2 | 154 | 0.1 | 5 | 164 | 41 | 25 |
| | | | | | | | 2 | 130 | | |
| Example 4 | 10 | 90 | 1100 | 74.1 | 151 | 0.1 | 5 | 218 | 74 | 34 |
| | | | | | | | 2 | 179 | | |
| Comparative Example 1 | 0 | 100 | 1200 | 85.1 | 150 | 0.1 | 5 | 237 | 85 | 36 |
| | | | | | | | 2 | 152 | | |
| Comparative Example 2 | 0 | 100 | 200 | 84.1 | 140 | 0.1 | 5 | 280 | 151 | 54 |
| | | | | | | | 2 | 131 | | |

From Table 1, it can be seen that birefringence in the transparent film of the present invention is not easily affected by the film forming conditions.

Although several embodiments of the present invention have been described above, these embodiments are presented as examples, and are not intended to limit the scope of the invention. These novel embodiments can be implemented in various other modes, and various omissions, replacements, and changes can be made thereto without departing from the spirit of the invention. These embodiments and modifications thereof are included in the scope and spirit of the invention, and are also included in the scope of the equivalents to the invention recited in the claims.

The invention claimed is:

1. A transparent film comprising a resin composition including a polycarbonate resin (A) having a structural unit represented by formula (1) and a polycarbonate resin (B) including a structural unit represented by formula (3), said transparent film having a photoelastic coefficient of 80×10$^{-12}$ m$^2$/N or less:

[Formula 1]

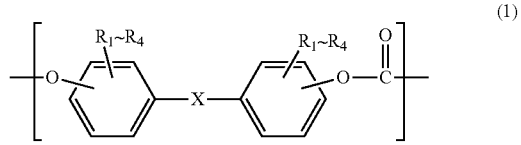

(1)

wherein $R_1$ to $R_4$ are each independently a hydrogen atom, an alkyl group, or an aryl group; and X is a single bond or a group represented by the following formula (2):

[Formula 2]

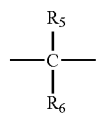

(2)

wherein $R_5$ and $R_6$ are a hydrogen atom, an alkyl group, or an aryl group; and at least one of $R_5$ and $R_6$ is an aryl group,

[Formula 3]

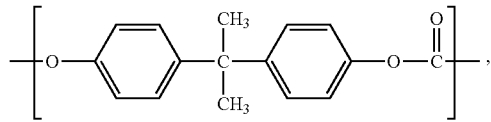

(3)

the resin composition comprises a mixture of the polycarbonate resin (A) and a polycarbonate resin (B), and a ratio of the polycarbonate resin (A) to a total mass of the polycarbonate resin (A) and the polycarbonate resin (B) is 10 to 90% by mass, and wherein the structural unit represented by formula (1) is, with respect to all of the structural units of the polycarbonate resin (A), included in a ratio of 95 to 100 mol %.

2. The transparent film according to claim 1, wherein the structural unit represented by formula (1) includes a structural unit represented by the following formula (4) or (5)

[Formula 4]

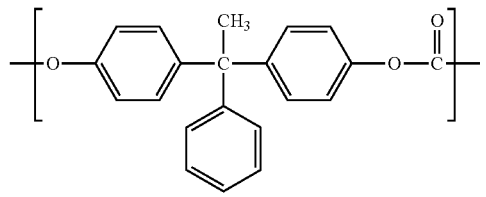

(4)

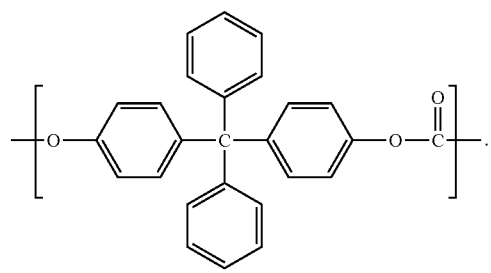

(5)

3. The transparent film according to claim 1, wherein the resin composition has a glass transition temperature of 150 to 185° C.

4. The transparent film according to claim 1, wherein the resin composition has a shear viscosity at 300° C. and a shear rate of 30 to 250 $sec^{-1}$ of 300 to 1200 Pa·s.

5. The transparent film according to claim 1, wherein the transparent film has a thickness of 30 to 200 μm.

6. The transparent film according to claim 1, further laminated with a high hardness resin layer having a pencil hardness of H or more.

7. An optical film comprising the transparent film according to claim 1.

8. The transparent film according to claim 1, wherein the transparent film is a film for a transparent electrode base material.

9. A transparent electrode comprising the transparent film according to claim 8 and a transparent electrode layer laminated on the transparent film.

10. The transparent electrode according to claim 9, wherein the transparent electrode layer includes one or more of ATO (antimony-doped indium oxide), FTO (fluorine-doped tin oxide), AZO (aluminum-doped zinc oxide), GZO (gallium-doped zinc oxide), ITO (indium tin composite oxide), Ag, Cu, Au, and a carbon nanotube.

11. The transparent film according to claim 1, wherein the transparent film is a protective film.

12. The transparent film according to claim 1, wherein the photoelastic coefficient is $57.1 \times 10^{-12}$ $m^2/N$ to $80 \times 10^{-12}$ $m^2/N$.

13. A transparent film comprising a resin composition including a polycarbonate resin (A) having a structural unit represented by formula (1) and a polycarbonate resin (B) including a structural unit represented by formula (3), said transparent film having a photoelastic coefficient of $80 \times 10^{-12}$ $m^2/N$ or less:

[Formula 1]

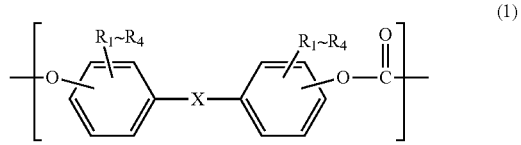

(1)

wherein $R_1$ to $R_4$ are each independently a hydrogen atom, an alkyl group, or an aryl group; and X is a single bond or a group represented by the following formula (2):

[Formula 2]

(2)

wherein $R_5$ and $R_6$ are a hydrogen atom, an alkyl group, or an aryl group; and at least one of $R_5$ and $R_6$ is an aryl group,

[Formula 3]

(3)

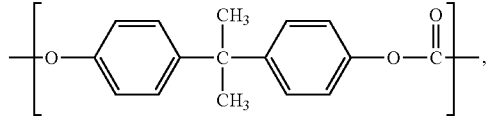

the resin composition comprises a mixture of the polycarbonate resin (A) and a polycarbonate resin (B), a ratio of the polycarbonate resin (A) to a total mass of the polycarbonate resin (A) and the polycarbonate resin (B) is 10 to 90% by mass, and the resin composition comprises 10% by mass or less of a resin other than the polycarbonate resin (A) and the polycarbonate resin (B).

14. The transparent film according to claim 13, wherein the structural unit represented by formula (1) includes a structural unit represented by the following formula (4) or (5)

[Formula 4]

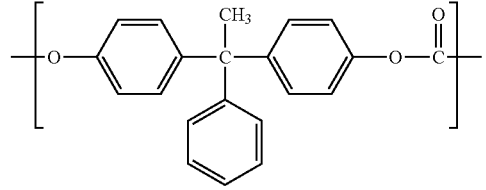

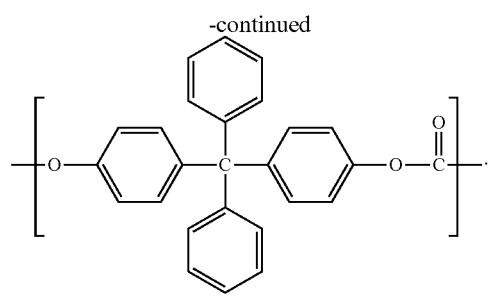

15. The transparent film according to claim 13, wherein the resin composition has a glass transition temperature of 150 to 185° C.

16. The transparent film according to claim 13, wherein the resin composition has a shear viscosity at 300° C. and a shear rate of 30 to 250 $sec^{-1}$ of 300 to 1200 Pa·s.

17. The transparent film according to claim 13, wherein the transparent film has a thickness of 30 to 200 μm.

18. The transparent film according to claim 13, further laminated with a high hardness resin layer having a pencil hardness of H or more.

19. An optical film comprising the transparent film according to claim 13.

20. The transparent film according to claim 13, wherein the transparent film is a film for a transparent electrode base material.

21. A transparent electrode comprising the transparent film according to claim 20 and a transparent electrode layer laminated on the transparent film.

22. The transparent electrode according to claim 21, wherein the transparent electrode layer includes one or more of ATO (antimony-doped indium oxide), FTO (fluorine-doped tin oxide), AZO (aluminum-doped zinc oxide), GZO (gallium-doped zinc oxide), ITO (indium tin composite oxide), Ag, Cu, Au, and a carbon nanotube.

23. The transparent film according to claim 13, wherein the transparent film is a protective film.

24. The transparent film according to claim 13, wherein the photoelastic coefficient is $57.1 \times 10^{-12}$ $m^2/N$ to $80 \times 10^{-12}$ $m^2/N$.

\* \* \* \* \*